United States Patent
Biskeborn et al.

(10) Patent No.: US 10,832,706 B2
(45) Date of Patent: *Nov. 10, 2020

(54) MULTICHANNEL TAPE HEAD MODULE HAVING THERMAL DEVICE FOR CONTROLLING SPAN BETWEEN TRANSDUCERS

(71) Applicant: International Business Machines Corporation, Armonk, NY (US)

(72) Inventors: Robert G. Biskeborn, Hollister, CA (US); Hugo E. Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,192

(22) Filed: Jan. 3, 2020

(65) Prior Publication Data

US 2020/0143825 A1  May 7, 2020

Related U.S. Application Data

(63) Continuation of application No. 16/164,659, filed on Oct. 18, 2018, now Pat. No. 10,580,438.

(51) Int. Cl.
  *G11B 5/10* (2006.01)
  *G11B 5/48* (2006.01)
  (Continued)

(52) U.S. Cl.
  CPC ............ *G11B 5/10* (2013.01); *G11B 5/00813* (2013.01); *G11B 5/4893* (2013.01); *G11B 5/588* (2013.01);
  (Continued)

(58) Field of Classification Search
  CPC ......... G11B 5/10; G11B 5/4893; G11B 5/588; G11B 5/00813; G11B 2005/0021; G11B 2005/0013
  See application file for complete search history.

(56) References Cited

U.S. PATENT DOCUMENTS 6,040,964 A  3/2000  Saliba
7,027,250 B2  4/2006  Lau
(Continued)

FOREIGN PATENT DOCUMENTS

GB  2409330 A  6/2005

OTHER PUBLICATIONS

Bain, J., "Recording heads: write heads for high-density magnetic tape," SPIE, vol. 2604, 2016, pp. 165-175.
(Continued)

*Primary Examiner* — Brian E Miller
(74) *Attorney, Agent, or Firm* — Zilka-Kotab, P.C.

(57) ABSTRACT

In one embodiment, an apparatus includes a module having an array of transducers, and a heating element having multiple parts positioned proximate to the array of transducers. The multiple parts of the heating element are distinct from each other, where the multiple parts include a first part, a second part, and a third part. In addition, the first part includes a center portion and the second and third parts include a second portion and a third portion, respectively, and are positioned on opposite ends and a center portion positioned therebetween. The heating element is configured to produce more heat per unit length along the second and third portions at the opposite ends than in the center portion.

8 Claims, 13 Drawing Sheets

(51) Int. Cl.
  *G11B 5/008* (2006.01)
  *G11B 5/588* (2006.01)
  *G11B 5/00* (2006.01)
(52) U.S. Cl.
  CPC .............. *G11B 2005/0013* (2013.01); *G11B 2005/0021* (2013.01)

(56) References Cited

U.S. PATENT DOCUMENTS

| | | |
|---|---|---|
| 8,081,398 B2 | 12/2011 | Hachisuka |
| 8,576,671 B1 | 11/2013 | Cha et al. |
| 8,654,473 B2 | 2/2014 | Fasen |
| 8,937,786 B1 | 1/2015 | Herget |
| 9,087,553 B2 | 7/2015 | Dellmann et al. |
| 9,093,091 B1 | 7/2015 | Chu et al. |
| 9,653,098 B2 | 5/2017 | Torline |
| 9,892,751 B1 | 2/2018 | Harper |
| 9,947,354 B1 | 4/2018 | Harper |
| 10,580,438 B1 | 3/2020 | Biskeborn et al. |
| 10,692,520 B2 | 6/2020 | Biskeborn et al. |
| 2004/0075940 A1* | 4/2004 | Bajorek .................. G11B 5/10 360/110 |
| 2007/0014041 A1 | 1/2007 | Lille et al. |
| 2009/0122444 A1 | 5/2009 | Ma et al. |
| 2009/0310248 A1 | 12/2009 | Hachisuka |
| 2010/0321816 A1 | 12/2010 | Saito |
| 2011/0069408 A1 | 3/2011 | Kurita et al. |
| 2012/0099218 A1 | 4/2012 | Kurita et al. |
| 2012/0188665 A1 | 7/2012 | Biskeborn et al. |
| 2012/0206832 A1 | 8/2012 | Hamidi et al. |
| 2015/0146507 A1 | 5/2015 | Boone, Jr. et al. |
| 2016/0232936 A1 | 8/2016 | Poorman et al. |
| 2020/0143824 A1 | 5/2020 | Biskeborn et al. |

OTHER PUBLICATIONS

Wikipedia, "Joule heating," Wikipedia, 2018, 11 pages, retrieved from https://en.wikipedia.org/wiki/Joule_heating.
Nave, R., "Resistance," Georgia Department of Education, HyperPhysics, 4 pages, retrieved on Oct. 18, 2018, from http://hyperphysics.phy-astr.gsu.edu/hbase/electric/resis.html.
Wikipedia, "Thermoelectric cooling," Wikipedia, 2018, 5 pages, retrieved from https://en.wikipedia.org/wiki/Thermoelectric_cooling.
Biskeborn et al., U.S. Appl. No. 16/164,659, filed Oct. 18, 2018.
Biskeborn et al., U.S. Appl. No. 16/164,683, filed Oct. 18, 2018.
Biskeborn et al., U.S. Appl. No. 16/734,182, filed Jan. 3, 2020.
Supplemental Notice of Allowance from U.S. Appl. No. 16/734,182, dated May 4, 2020.

\* cited by examiner

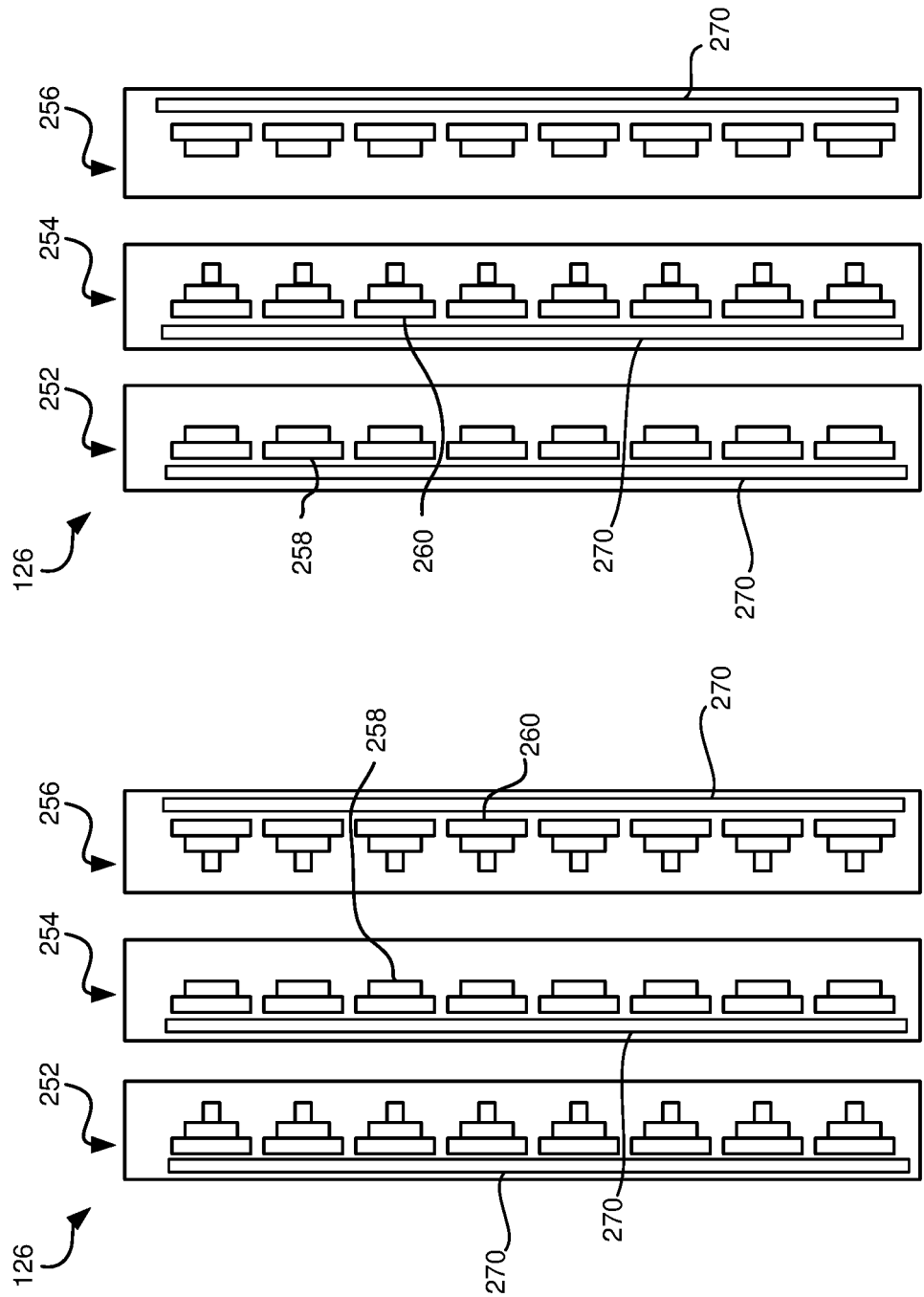

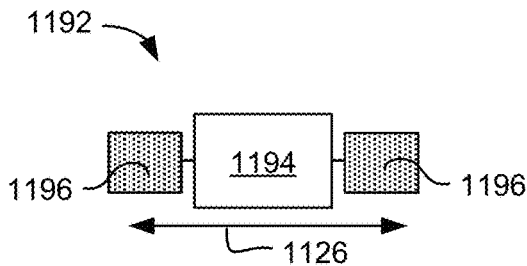

FIG. 11G

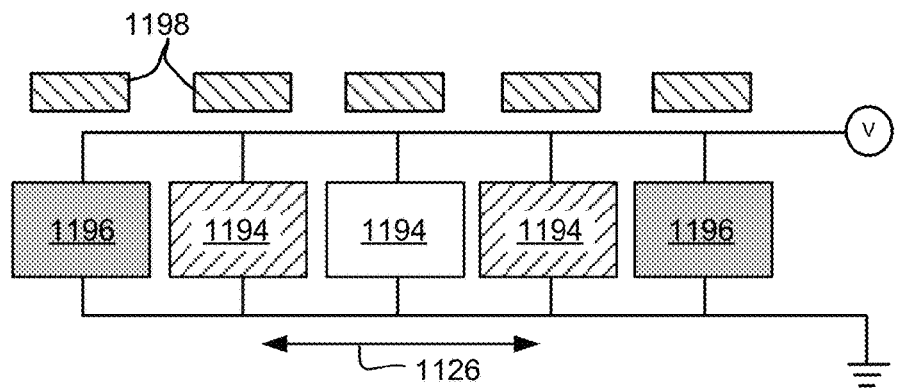

┌─────────────────────────────────────────────┐
│ Determine whether the span of the array of transducers in a │ ─ 1202
│ module is different than a target based on a specification. │
└─────────────────────────────────────────────┘
                      │
                      ▼
┌─────────────────────────────────────────────┐
│ In response to determining the span is less than the target, │
│ apply a current to a heating element positioned proximate to │
│ the span of the array of transducers for expanding the span of │ ─ 1204
│ the array of transducers to the target, where the heating │
│ element is configured to substantially uniformly heat the │
│ module along the heating element. │
└─────────────────────────────────────────────┘

FIG. 12

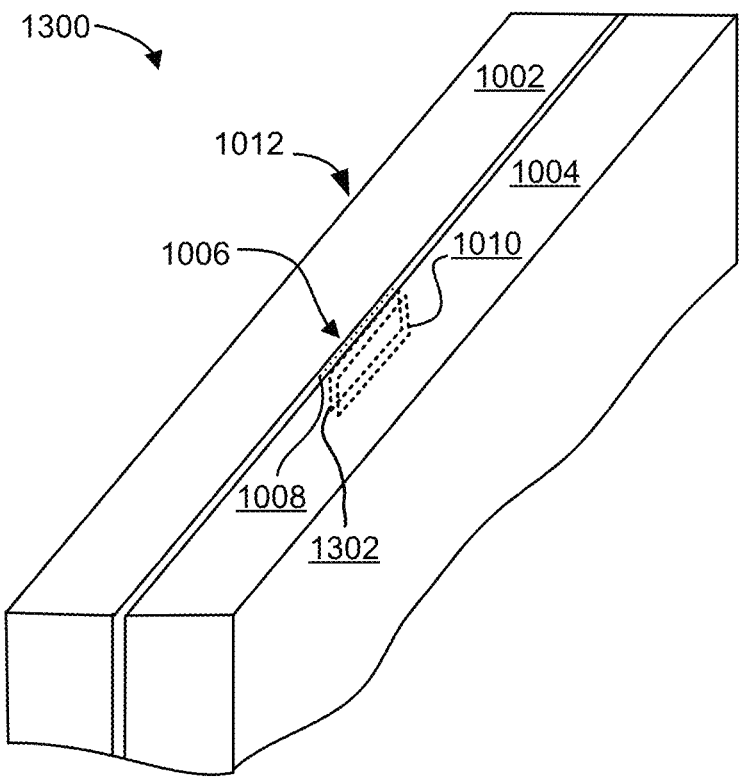
FIG. 13A
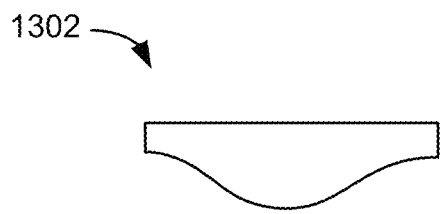 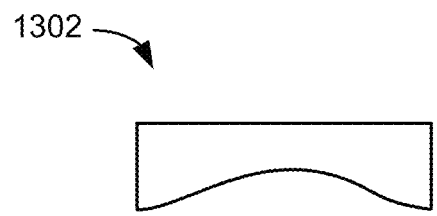
FIG. 13B  FIG. 13C

MULTICHANNEL TAPE HEAD MODULE HAVING THERMAL DEVICE FOR CONTROLLING SPAN BETWEEN TRANSDUCERS

BACKGROUND

The present invention relates to data storage systems, and more particularly, this invention relates to controlling span between transducers of a multichannel tape head modules.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape and decreasing the thickness of the magnetic tape medium. However, the development of small footprint, higher performance tape drive systems has created various problems in the design of a tape head assembly for use in such systems.

SUMMARY

In one embodiment, an apparatus includes a module having an array of transducers, and a heating element having multiple parts positioned proximate to the array of transducers. The multiple parts of the heating element are distinct from each other, where the multiple parts include a first part, a second part, and a third part. In addition, the first part includes a center portion and the second and third parts include a second portion and a third portion, respectively, and are positioned on opposite ends and a center portion positioned therebetween. The heating element is configured to produce more heat per unit length along the second and third portions at the opposite ends than in the center portion.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTIONS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIGS. 11B-11H are schematic drawings of various heating elements, according to various embodiments.

FIG. 12 is a flow chart of a method, according to one embodiment.

FIG. 13A is a schematic drawing of a partial view of a model having a heating element, according to one embodiment.

FIGS. 13B and 13C are schematic drawings of expansion control plates, according to various embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a module having an array of transducers and a heating element positioned proximate to the array of transducers. The heating element has opposite ends and a center portion therebetween, where the heating element is configured to produce more heat per unit length along the opposite ends than in the center portion.

In another general embodiment, a method of maintaining a span of an array of transducers of a module to a target based on a specification is provided. The method includes determining whether the span of the array of transducers in a module is different than a target based on a specification, and in response to determining the span is less than the target, applying a current to a heating element positioned proximate to the span of the array of transducers for expanding the span of the array of transducers toward the target. The heating element is configured to substantially uniformly heat the module along the heating element.

In yet another general embodiment, an apparatus includes a module having an array of transducers, a heating element positioned proximate to the array of transducers, and an expansion control plate configured to provide a generally uniform thermal expansion of the array of transducers in association with the heating element.

Figure 1A:
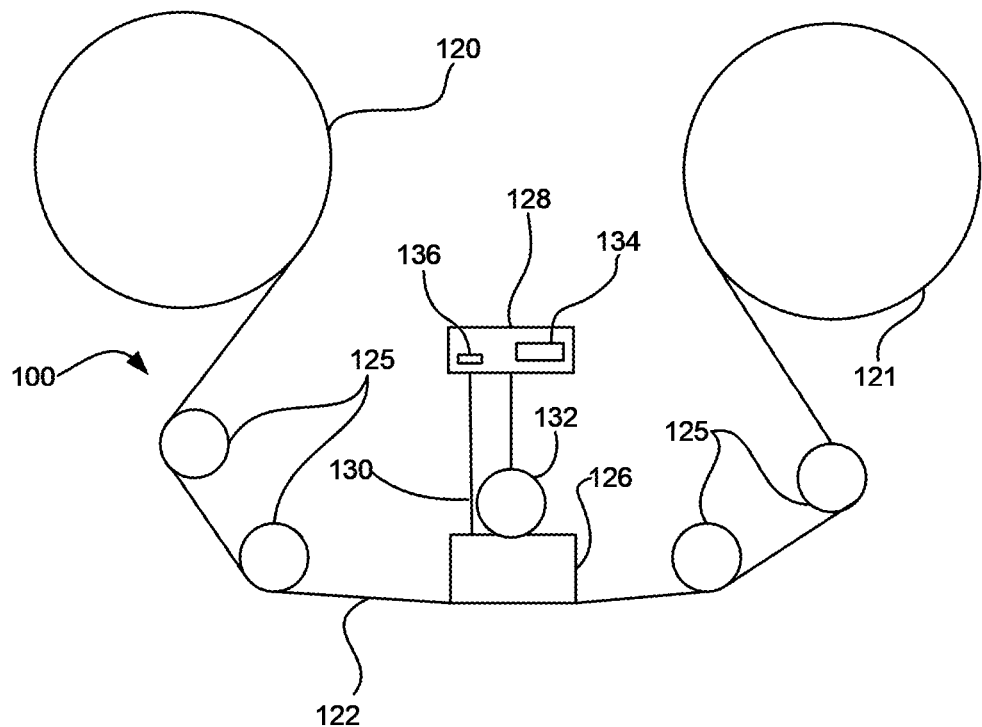
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
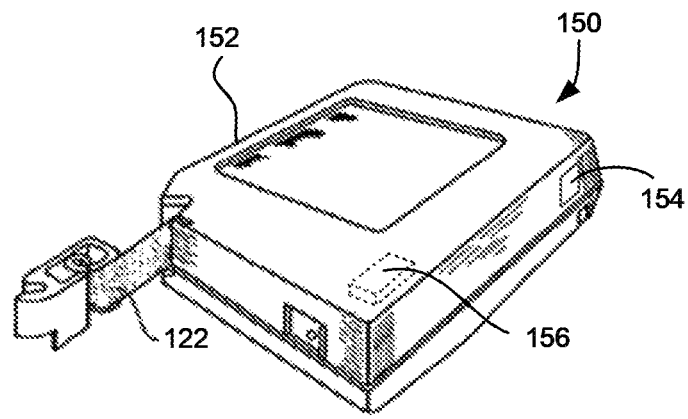
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
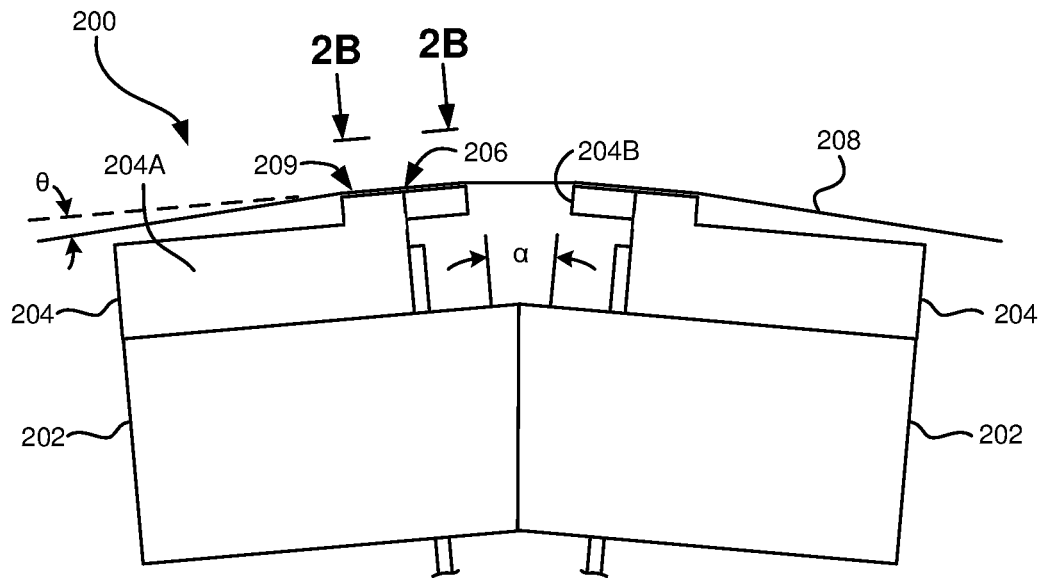
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
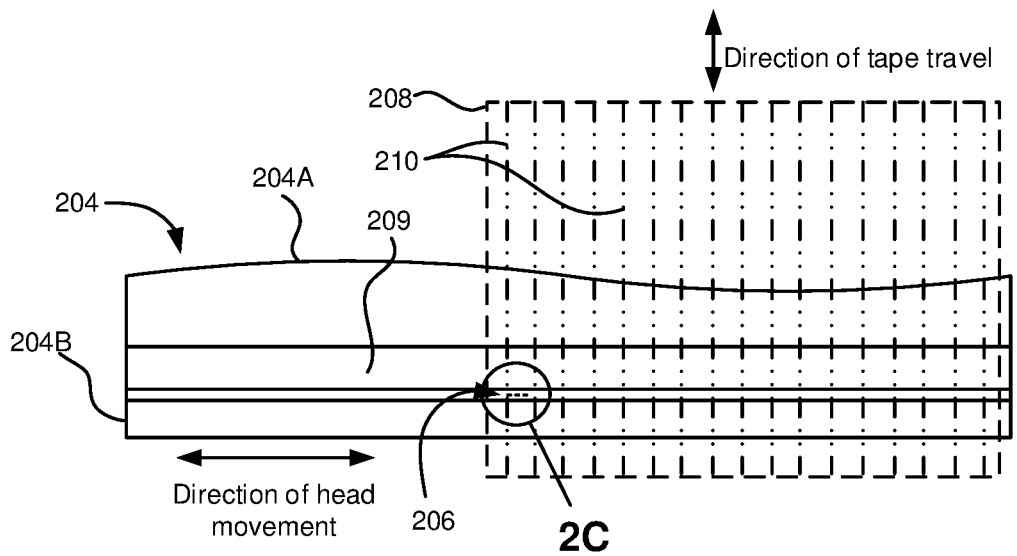
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
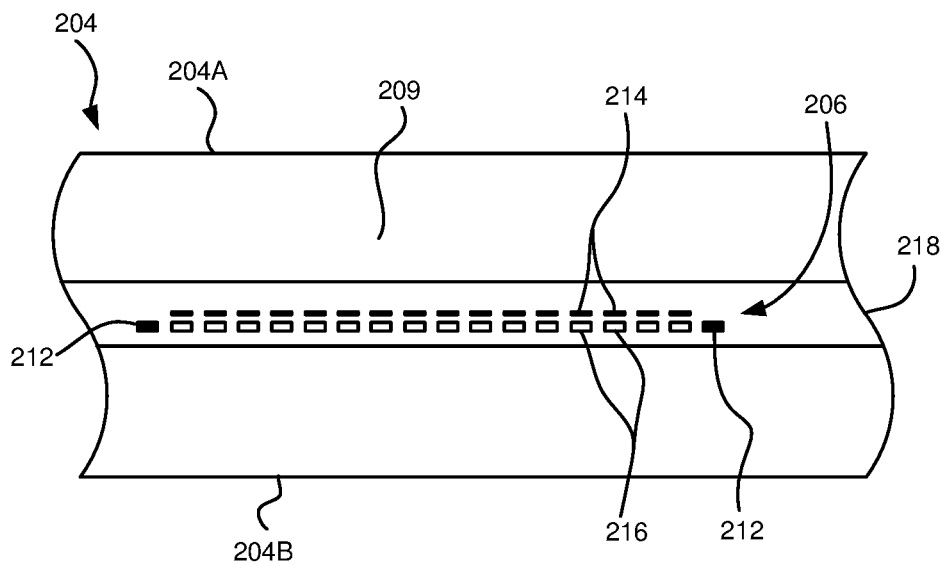
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
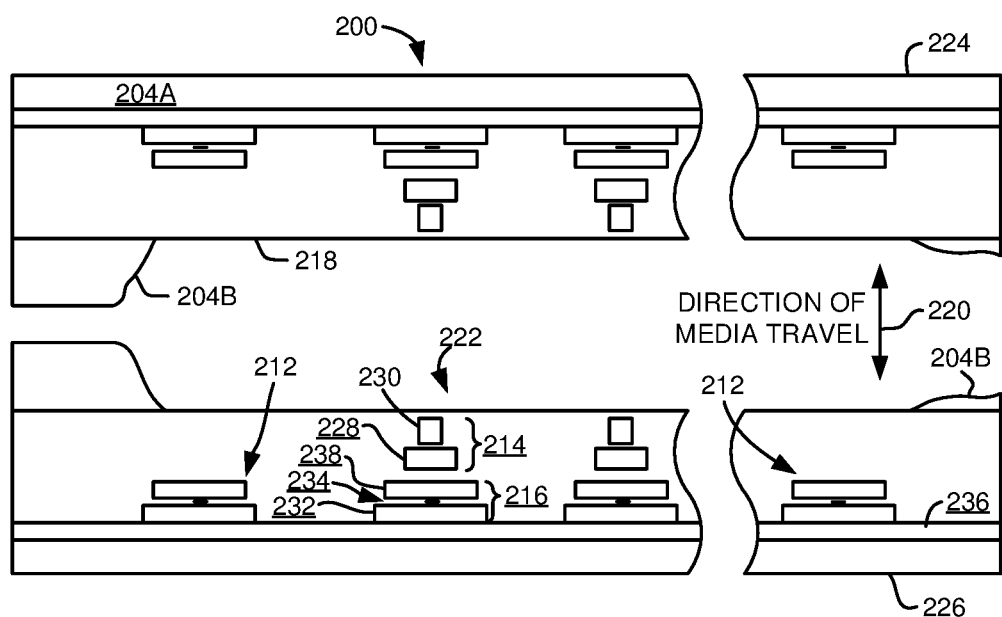
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
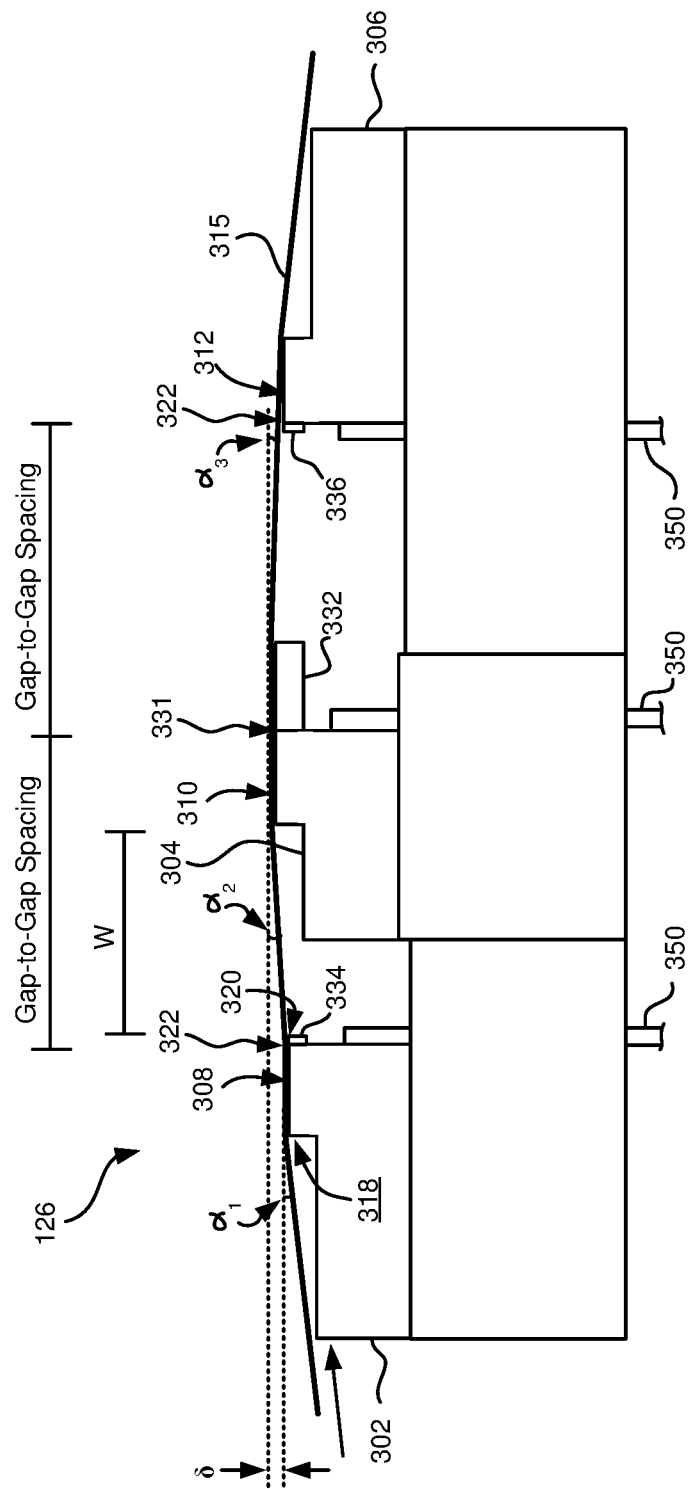
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
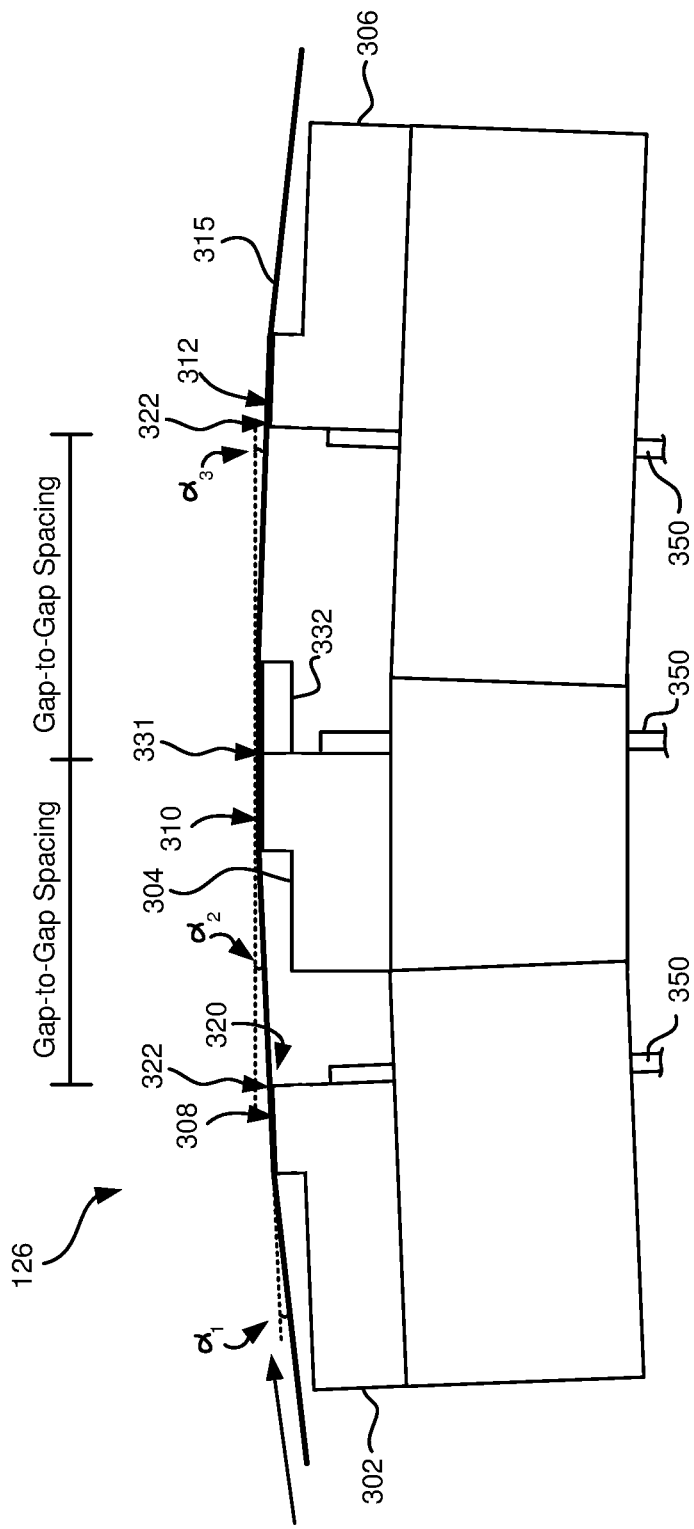
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
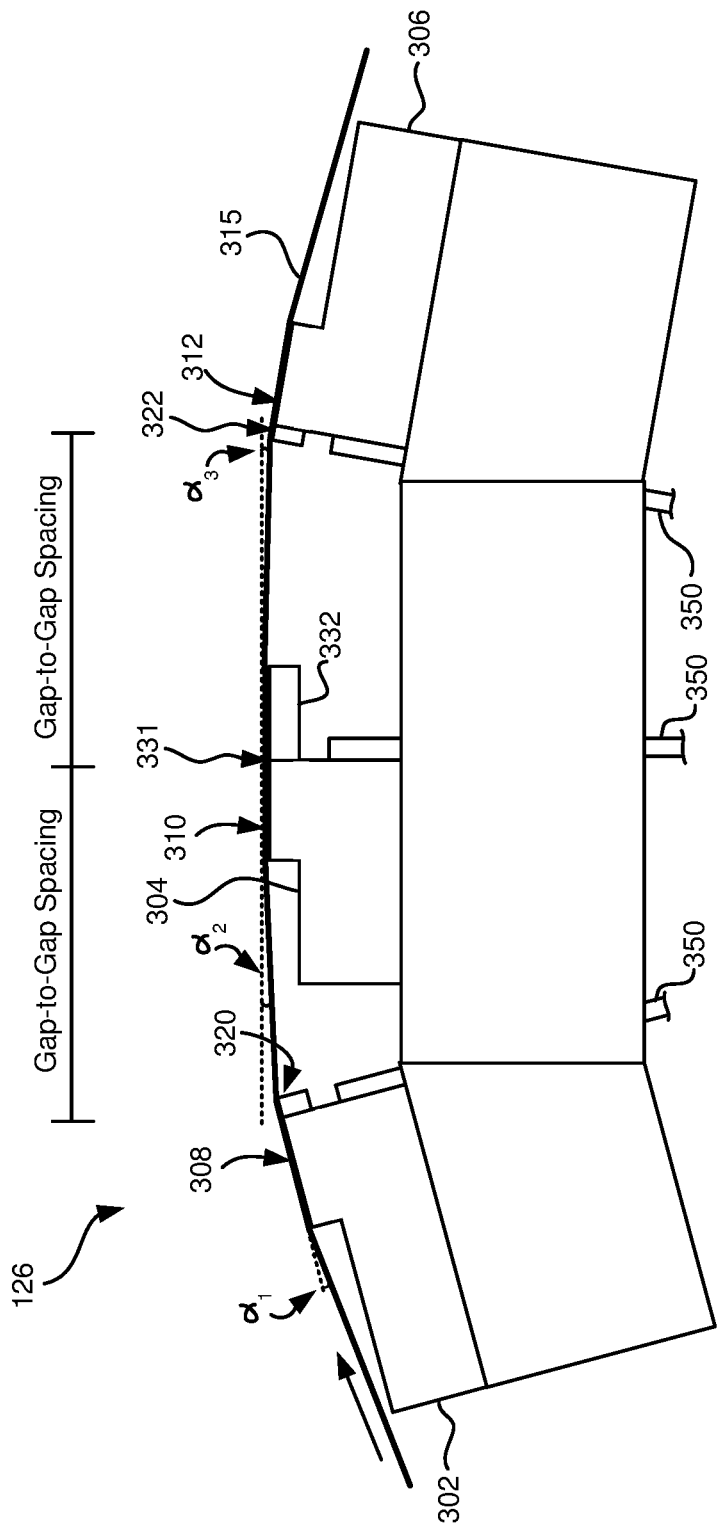
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
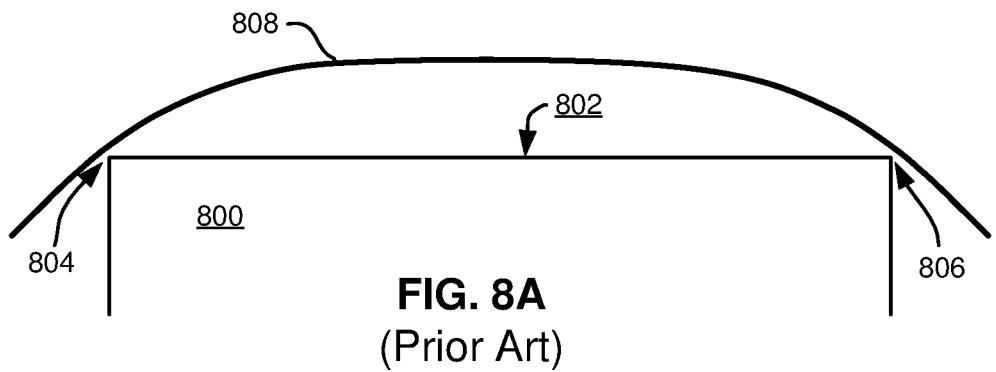
FIGS. 8A-8C are schematics depicting the principles of tape tenting.
Figure 8B:
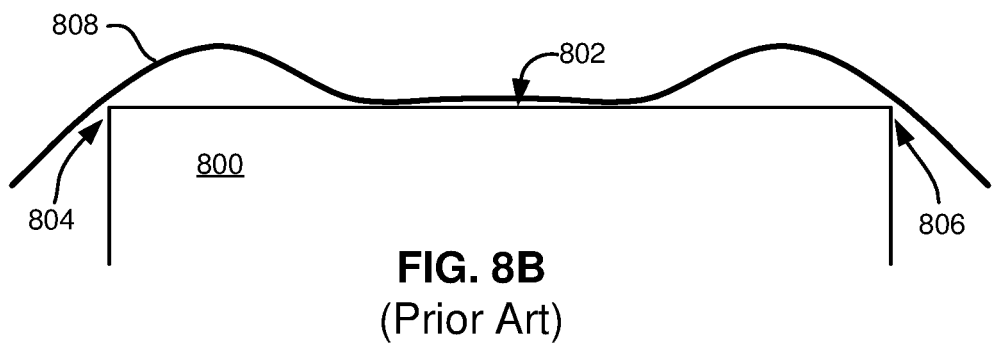
Figure 8C:
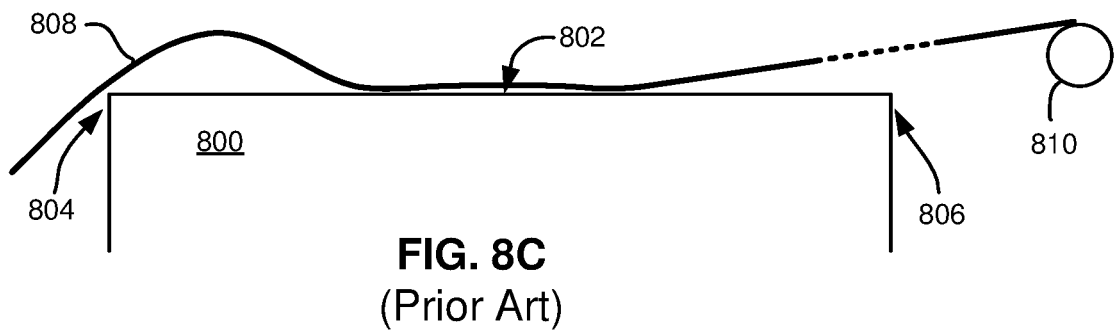

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
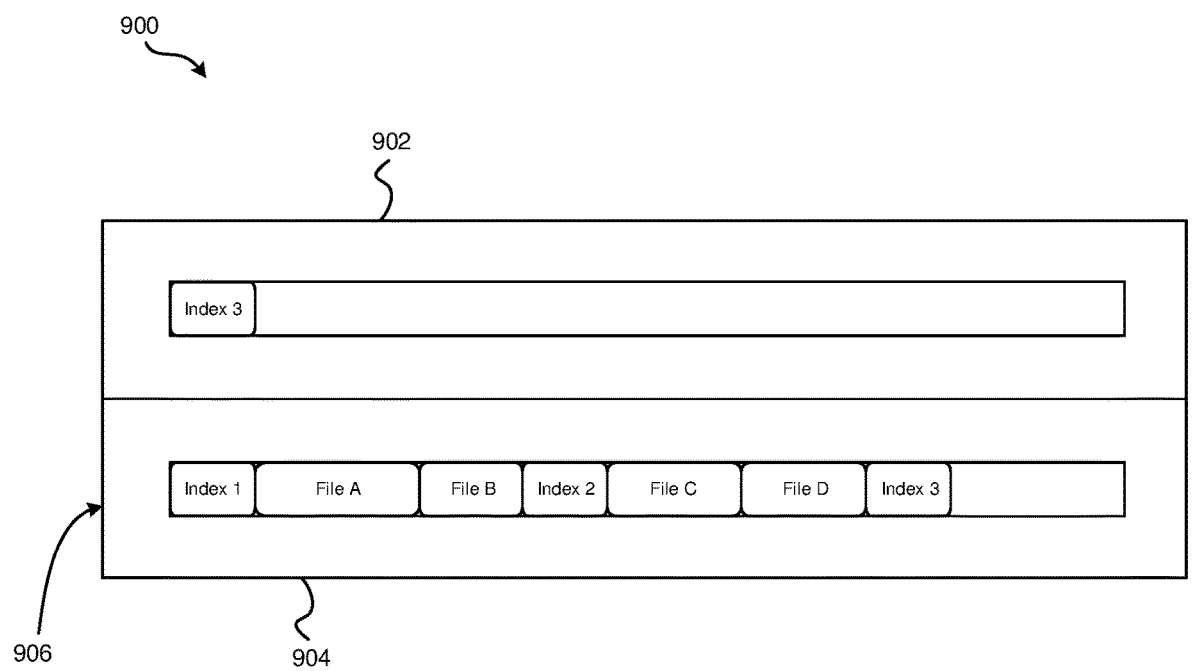
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, a continuing goal of the data storage industry is to improve data density, such as by reducing track width. However, limitations in head manufacturing result in variation in span of tracks from head-to-head, thereby leading to limits of a real density due to the resulting misplacement of tracks during writing. Moreover, such misplacement of written tracks present future repercussions in that it affects reading such data. Thus, the variation of span between channels from head-to-head is a serious problem. For instance, even though manufactured to exacting specifications on a single wafer, head span between outermost transducers can vary from head-to-head by as much as 600 nanometers (nm) or more in current generation LTO heads that are designed for writing and reading one-half inch, 4 data band magnetic recording tapes.

In one embodiment described herein, in a module, the span of data transducers and servo reading elements that flank the data transducers may be altered by a control element. In some approaches, a closed loop feedback circuit may facilitate the control element.

In some embodiments, a head module may be comprised of a thin film resistive element positioned proximate to the transducers and coupled to a source of electrical current. When current flows through the resistive element, the temperature of the resistive element rises due to joule heating, which in turn raises the temperature of the module in the vicinity of the element. The increased temperature of and around the element induces thermal expansion of the heated region and thus an increase in the span of data transducers of the module.

In a preferred embodiment, a control circuit adjusts power in the heating element to maintain a constant or near constant span length, e.g., a target length based on a specification such as LTO. In some approaches, the target span of the data transducers may be a pre-determined value, e.g., a design value.

In other approaches, the proper transducer spacing and/or array length may be determined as a function of the state of lateral expansion of the tape, e.g., if the tape is in a laterally expanded state relative to the state when it was written, the array length may be increased. Accordingly, comparing the timing detected by servo readers flanking the array of data transducers to the timing when the tape was written may indicate a change in the tape expansion or a change in head span or both, and thereby prompting an adjustment of the heating element to control the heat to the region.

The rise in temperature and thus the change in span of transducers is a function of several factors, including power dissipation in the resistive element, design of the resistive element, the precise location of the resistive element in the head module, tape velocity, head lands design, heat dissipation in the module, etc., the effect of each of which may be determined via modeling. Moreover, a magnetic recording tape moving over a head module effectively removes heat generated by the heating element. In some embodiments, the speed of the moving magnetic recording tape may be adjusted by the controller to alter head span. Generally, lower speeds of a moving magnetic recording tape results in higher temperature rise for a given heater power compared to a lower temperature rise by higher speeds of the moving magnetic recording tape. The moving magnetic recording tape may also become heated thereby resulting in tape expansion. Tape expansion due to increased heat may work against the heat-mediated expansion of the head span. Typically, however, the tape expands in response to increased temperature. Moreover, tape expansion due to heating may also be a function of tape speed, for a given power of heat generated by the resistive element.

Figure 10B:
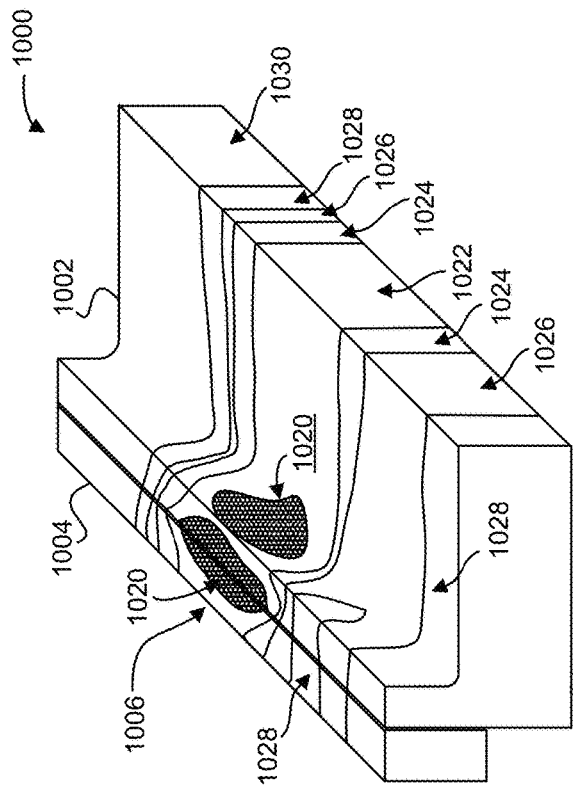
FIG. 10B is temperature map of the module of FIG. 10A, according to modeling studies.
Figure 10C:
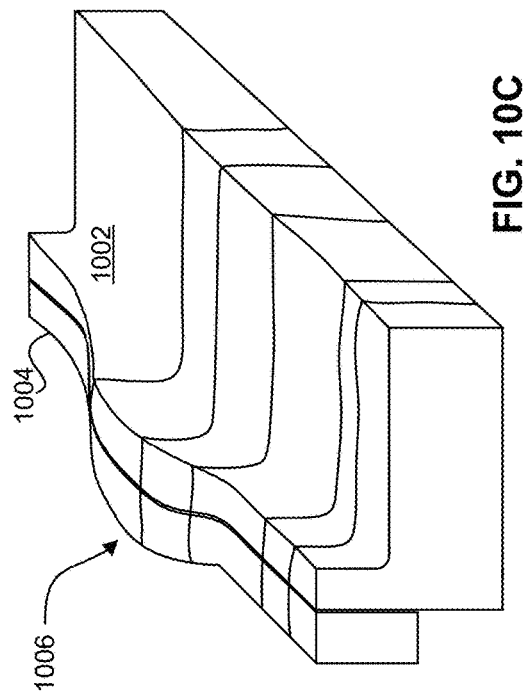
FIG. 10C is a map of thermal expansion of the module of FIG. 10A, according to modeling studies.
Figure 10A:
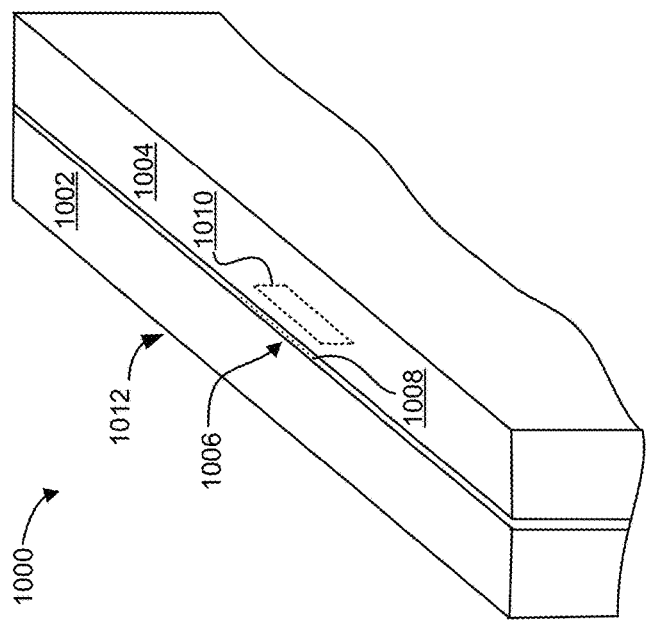
FIG. 10A is a schematic drawing of a partial view of a module having a rectangular heating element.

FIG. 10A depicts a schematic diagram of an apparatus 1000 having a resistive heating element to control span between channels, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

FIG. 10A illustrates a schematic drawing of an apparatus 1000 having a resistive heating element 1010 aligned along a longitudinal axis of the span 1006 of the array of transducers 1008, according to one embodiment. As shown, the resistive heating element 1010 may be positioned above the substrate 1002 in the thin films between the substrate 1002 and the closure 1004 of the head module. The resistive heating element may be positioned below (recessed from) the tape bearing surface 1012. In some approaches, the resistive heating element 1010 may be offset above the substrate 1002 (e.g. offset approximately 1-5 microns, e.g., 3 microns above the substrate).

The heating element 1010 may be constructed of any conductive material that creates joule heating upon passing a current therethrough. Leads for connecting the heating element 1010 to a controller cable may be fabricated in the thin films. One skilled in the art, once apprised of the teachings herein, would appreciate that conventional techniques and materials may be adapted for use in fabricating the heating element, surrounding layers, and leads.

FIG. 10B illustrates a predictive temperature rise in the module 1000 with heat generated from the resistive heating element 1010. A partial view of the module is shown with the substrate 1002 facing to the right and the closure 1004 toward the left of the schematic drawing. As expected with a rectangular shaped resistive heating element 1010, the temperature is greatest near the center of the span 1006 of the array. FIG. 10B shows the highest temperature as a first region 1020 depicted by the dark shading where the first region 1020 is positioned near the tape bearing surface 1012 and around the region of the span 1006 of the array of transducers 1008. In the illustrative predictive modeling study shown, the first heated region 1020 depicted by the dark shading may be at a temperature of about 78° C. for an ambient temperature of 30° C.

A temperature gradient in the module is represented in the drawing by the lines drawn crosswise on the module. The second heated region 1022, but not having a temperature as high as the dark shaded region 1020, surrounds the dark shaded region 1020 and may extend through the module in a cross-wise direction. In predictive modeling studies the second heated region 1022 may be about 64° C. Heated regions spreading out from the resistive heating element 1010 and the span 1006 of the array of transducers 1008 may include a 3$^{rd}$ heated region 1024, a 4$^{th}$ heated region 1026, a 5$^{th}$ heated region 1028, a 6$^{th}$ heated region 1030, and so on. In predictive modeling studies the temperatures of these regions may be approximately 60° C., 55.5° C., 51° C., 47° C., respectively, relative to the temperature of 78° C. of the first heated region 1020. Again, these temperatures are presented by way of example only for exemplary purposes only.

As is apparent from these modeling studies of a rectangular resistive heating element, the heat from the element produces a nonuniform temperature profile across the span 1006 of the array of transducers 1008, and in fact, a concentration of heat is generated toward the center of the array of transducers, resulting in the local "hot spot" toward the center.

FIG. 10C depicts a schematic drawing of the predictive thermal expansion per watt of heater power in the module in response to the temperature rise generated by the resistive heating element. Similar to the drawing of FIG. 10B, a partial view of the module 1000 is shown with the substrate 1002 to the right and the closure 1004 toward the left on the drawing of the module. As expected from the temperature gradient predictions of FIG. 10B, the thermal expansion of the module is not linear along the array. Rather, as shown in FIG. 10C, a non-uniform deformation of the region of the span 1006 of the array of transducers 1008 may result in response to the higher temperatures at the center of the array and the decreasing temperature away from the center of the array, resulting in greater pitch between transducers toward the middle of the array than at the ends, as well as localized protrusion of the tape bearing surface. From predictive modeling studies, the deviation from ideal linear expansion may be 20 nm or more. Thus, the heating element in a rectangular shape as shown in FIG. 10A does not induce uniform expansion of the transducer region, and therefore, does not work as expected.

Thus, providing a rectangular resistive thin film heating element with a uniform resistivity throughout the element may not be a favorable solution to the problem of misregistration between channels in the head and tracks on tape. In various embodiments described herein, the resistive heating element may be re-shaped to accommodate the non-uniform temperature rise along the span of the array of transducers and the resulting non-linear thermal expansion of the module in this region. According to Ohmic heating (also known as joule heating and resistive heating), in which the passage of an electric current through a conductor produces heat, heat produced by a heating element may be defined by the following Equation 1 and Equation 2:

$$\text{Heat produced (Q)} = \text{resistance (R)} \sim \text{current}^2 (I^2), \quad \text{Equation 1}$$

$$\text{Resistance (R)} = \text{resistivity (}\rho\text{)} \cdot \text{length (L)/area (A)} \quad \text{Equation 2}$$

Thus, the heat produced (Q) is proportional to the resistance (R), and the resistance (R) of a conductor is inversely proportional to the cross-sectional area (A) of the conductor. According to various embodiments described herein, a heating element may be designed that has a different resistance for different portions of the heating element such that when current is passing from one end of the heating element to the other, heat is generated non-uniformly, but in such a manner as to raise the temperature of the region surrounding the heating element more uniformly than as presented in FIG. 10B. In various embodiments, the rise in temperature by the heating element may result in a more uniform expansion across the span of transducers of the module.

FIG. 11 depicts an apparatus 1100 having a resistive heating element to alter span between transducers, in accordance with one embodiment. As an option, the present apparatus 1100 may be implemented in conjunction with features from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment.

According to one embodiment, an apparatus includes a module having an array of transducers and a heating element positioned proximate to the array of transducers where the heating element has opposite ends and a center portion therebetween. Moreover, the heating element is configured to produce more heat per unit length along the opposite ends than per unit length along the center portion. For example, the heating element may have a different, e.g., higher, resistance per unit length along the opposite ends than in the center portion when a current is passing from one end to the other, thereby e.g., causing more heat to be produced toward the ends than in the center. Thus, in the embodiment described herein, the heating profile of the resistive heating element in the module may be relatively flat therealong, thereby inducing a more uniform thermal expansion.

Figure 11C:
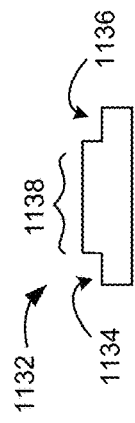
Figure 11D:
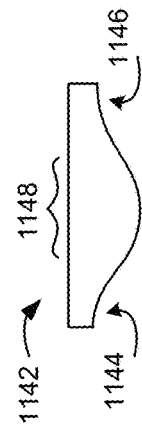
Figure 11E:
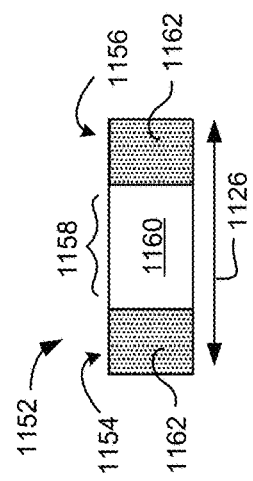
Figure 11F:
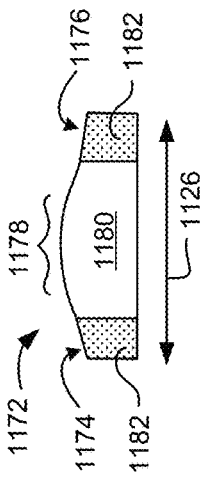
Figure 11A:
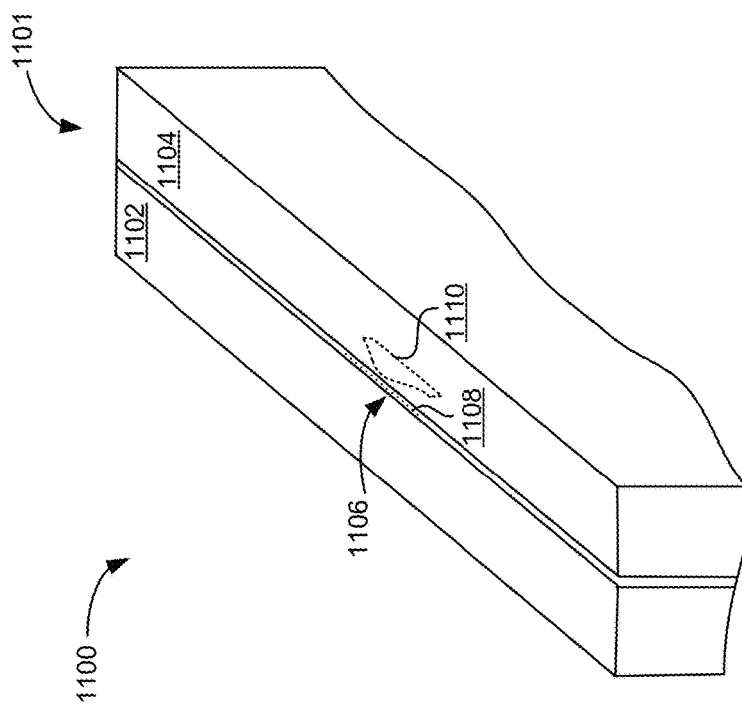
FIG. 11A is a schematic drawing of a partial view of a module having a heating element, according to one embodiment.

In one embodiment depicted in FIG. 11A, an apparatus 1100 includes a module 1101 having an array 1106 of transducers 1108, a heating element 1110 positioned proximate to the array 1106 of transducers, a substrate 1102 and an optional closure 1104.

Figure 11B:
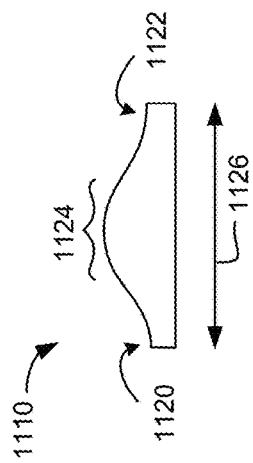

FIG. 11B shows a schematic drawing of a cross-section of the heating element 1110, according to one embodiment. The heating element 1110 has opposite ends 1120, 1122 and a center portion 1124 therebetween. In some approaches, a higher resistance per unit length along the opposite ends 1120, 1122 may be established by shape.

As shown, the heating element 1110 may be wider near the center than at the edges and thus have a higher resistance per unit length along the opposite ends 1120, 1122 than in the center portion 1124 when a current is passing from one end to the other, thereby causing more heat to be produced toward the ends than in the center. In some approaches, a cross-sectional area of the center portion 1124 may be greater than a cross-sectional area of each of the opposite ends 1120, 1122 as measured perpendicular to the longitudinal axis 1126 of the heating element 1110.

In some approaches, the center portion 1124 of the heating element 1110 may have a length along a longitudinal axis 1126 in a range of between approximately one third of a length of the array of transducers to approximately two thirds of the length of the array of transducers. In other approaches, the heating element 1110 may have a length along a longitudinal axis 1126 in a range of between approximately one third or one half of a length of the array of transducers and the full length of the array of transducers. In yet another approach, the heating element 1110 may have a length along a longitudinal axis 1126 that is greater than the full length of the array of transducers. In some approaches the length of the array of transducers may include outermost data transducers as the endpoints of the measurement. In other approaches, the length of the array of transducers may include servo transducers as the endpoints of measurement.

In some approaches, as shown in FIG. 11C, a heating element 1132 having a wider center portion than at the opposite ends may have a shape having straight edges at the opposite ends, where the opposite ends 1134, 1136 thus have a higher resistance per unit length than the center portion 1138 when a current is passing from one end to the other. As in other approaches, more heat per unit length may be produced toward the ends than in the center of the heating element 1132.

In some approaches, as shown in FIG. 11D, the heating element 1142, having a wider center portion 1148 than at the opposite ends 1144, 1146 may have a shape having edges at the opposite ends, may be formed by masking techniques that create unique shapes where the opposite ends 1144, 1146 have a higher resistance than the center portion 1148 when a current is passing from one end to the other.

In some approaches, the heating element is a thin film resistive element.

In one embodiment, the resistivity of the center portion of the heating element is less than the resistivity at each of the opposite ends of the heating element. As used herein, "resistivity" refers to the sheet resistivity of the described item. As shown in FIG. 11E, the resistivity of the center portion 1158 of a heating element 1152 may be less than the resistivity of each of the opposite ends 1154, 1156. In some approaches, the material 1160 of the center portion 1158 may have a lower resistivity than a second material 1162 of each of the opposite ends 1154, 1156. Accordingly, the heating element 1152 may be formed of more than one material. In another approach, the center portion 1158 or ends 1154, 1156 may be doped, subjected to ion implantation, etc. for setting the resistivity thereof.

In some approaches, the heating element may have a rectangular shape. In some approaches, the center portion 1158 may have a length along a longitudinal axis 1126 in a range of between approximately one third of a length of the array of transducers to approximately two thirds of the length of the array of transducers. In some approaches the length of the array of transducers may include data transducers as the endpoints of the measurement. In other approaches, the length of the array of transducers may include servo transducers as the endpoints of measurement.

In some approaches, the heating element is a thin film resistive element.

In one embodiment as illustrated in FIG. 11F, in heating element 1172, a cross-sectional area of the center portion 1178 that is greater than a cross-sectional area of each of the opposite ends 1174, 1176 as measured perpendicular to the longitudinal axis 1126 of the heating element 1172.

In some approaches, e.g., as illustrated in FIG. 11F, the resistivity of the center portion 1178 of a heating element 1172 may be less than the resistivity of each of the opposite ends 1174, 1176. In some approaches, the material 1180 of the center portion 1178 may have less resistivity than a second material 1182 of each of the opposite ends 1174, 1176.

In a further approach, e.g., as illustrated in FIG. 11G, a heating element 1192 may be comprised of multiple parts. Various portions may be configured to have different heat generation than other portions. In one approach, the resistance of the center portion 1194 or portions is less than the resistance of the opposite end portions 1196. In another approach, the resistance and/or heat generation of the center portion 1194 or portions is similar to the resistance and/or heat generation of each of the opposite end portions 1196. Any number of portions may be present. In one approach, the center portion 1194 may include several distinct portions, each of which generate heat.

In various approaches, the portions may be connected in series as shown in FIG. 11G. In other approaches, the portions are connected in parallel, e.g., as shown in FIG. 11H. Moreover, in some embodiments, as exemplified in FIG. 11H, the portions 1194, 1196 may be proximate to individual transducers 1198, e.g., 32 portions may be adjacent 32 transducers.

Again, this may be effected in a variety of ways. For instance, a cross sectional area of the end portions 1196 may be smaller than the cross-sectional area of the center portion 1194. In another approach, a resistivity of the center portion 1194 may be less than the resistivity of each of the opposite end portions 1196. A combination of the foregoing approaches may be implemented in a further approach. Conventional connectivity may be used to connect the end and center portions.

In some approaches, the resistivity of the material of the different portions of the heating element may be set by using masking layers where portions of the heating element have more layers resulting in a thicker portion toward a center of the element, and other portions of the heating element have less layers resulting in a thinner portion of the heating element flanking the center. In one approach, the peripheral shape of the heating element along the plane of deposition may be rectangular, but the thickness of the different portions of the heating element vary, resulting in a heating element with portions having different resistances to generate a uniform temperature profile in the surrounding region.

Looking back to FIGS. 3 and 4, according to one embodiment, a heating element 270 may be positioned proximate to an array of readers 258 and/or an array of writers 260. The heating element 270 may have any configuration disclosed herein in various approaches.

In various embodiments described herein, the apparatus includes a controller electrically coupled to the heating element, where the controller is configured to control a power level (e.g., current) applied to the heating element for controlling an extent of thermal expansion of the module based on a current state of expansion of a magnetic recording tape moving over the module.

In various embodiments, an apparatus includes a drive mechanism for passing a magnetic medium over the array of transducers, and a controller electrically coupled to the heating element and the array of transducers.

In some embodiments, during conventional head manufacturing, the span of transducers on the wafer may be altered to better center the range of adjustment for later expansion to accommodate variation in span of tracks during reading and writing various tapes. For example, a span of an array of transducers on a wafer may be smaller by 50 nm, 100 nm, 150 nm, or more than a design specification. The heating element, with current applied, may increase the span to a nominal target value when in use (e.g. tape running).

Moreover, in some approaches, the span of the array of transducers on a wafer during manufacturing may be adjusted to better center a range of control over a predetermined ambient operation temperature range.

FIG. 12 depicts a method 1200 for maintaining a span of an array of transducers of a module to a specification in accordance with one embodiment. As an option, the present method 1200 may be implemented in conjunction with features from any other embodiment listed herein, such as those described with reference to the other FIGS. Of course, however, such a method 1200 and others presented herein may be used in various applications and/or in permutations which may or may not be specifically described in the illustrative embodiments listed herein. Further, the method 1200 presented herein may be used in any desired environment.

Operation 1202 of method 1200 begins with determining whether the span of the array of transducers in a module is different than a target based on a specification. The target based on the specification may include any type and measurement combination of measurements between any features of the module, such as a target transducer array length, a distance between outermost servo readers, an average design transducer pitch, etc. In some approaches, determining whether the span of the array of transducers is different than the target based on the specification includes reading at least two servo tracks of a magnetic recording tape and deriving a length of the span therefrom, and comparing the length to a target length based on a specification. In some approaches, the target may be based on a current state of expansion of the magnetic recording tape as would be reflected in the actual distance between adjacent servo tracks. For example, reading servo tracks of a moving magnetic recording tape indicate that the length of the span of the array of transducers of the module is less than the target of the specification of the magnetic recording tape in use, thereby indicating a possible misplacement of tracks on the magnetic recording tape.

In the absence of a cooling element in the module, a heating element may provide a means of increasing head span to meet the target.

In response to determining the span of the array of transducers is less than the target, operation 1204 includes applying a current to a heating element positioned proximate to the span of the array of transducers for expanding the span of the array of transducers toward the target via inducing thermal expansion of the module. The heating element may be configured to uniformly heat the module along a majority of the heating element (e.g., 80% or more of the length of the heating element).

In some approaches, the heating element has opposite ends and a center portion therebetween, where the heating element has a higher resistance per unit length along the opposite ends than in the center portion. In some approaches, the cross-sectional area of the center portion is greater than a cross-sectional area of each of the opposite ends of the heating element.

In some approaches, the resistivity of the center portion is less than a resistivity of each of the opposite ends.

In some approaches, the span of array of transducers may be formed on the wafer during manufacture to have a nominal proportion that is smaller than the target defined by the specification (e.g. the span on the wafer may be smaller by 50 nm, 100 nm, 150 nm, or more than a specification-defined target). Then when the head is in use with tape running, a current may be applied to the heating element to increase the span of the array of transducers to a nominal target to meet the specification of the tape in use.

In some approaches, method 1200 may be employed to adjust the span of an array of transducers to operate to a specification of the tape in use over a pre-determined ambient temperature range.

In some approaches, method 1200 may include adjusting tension of a moving magnetic recording tape over the array of transducers for altering a width of the tape. Tape tension compensation may dynamically adjust a span of transducers on the module to minimize misregistration with a specific tape. For example, tapes may undergo dimensional changes during changes in temperature and/or humidity, tape creep after writing, etc. The width of the outermost tape windings (e.g. may be as much as one-third of the tape) may undergo a contraction due to tape tension in the outer windings.

Moreover, in a same tape cartridge, the innermost tape windings may undergo an expansion from tape pack pressure.

The tape tends to absorb heat from the module, and therefore may itself expand due to the heating. Therefore, one embodiment, the state of the tape is monitored via the track following system and the amount of heating is adjusted accordingly to maintain the proper transducer array length. In addition, and/or alternatively, the tape speed may be adjusted to control the amount of heat absorbed by the tape, thereby providing a level of control over the degree of registration between module and tape.

In a further embodiment, an expansion control plate may be used to provide a generally uniform expansion of the array of transducers in association with the heating element, e.g., in conjunction with the heating characteristic of the heating element. For example, referring again to FIGS. 10A-10C, the heating element creates very non-uniform expansion due to the creation of hot spots. However, an expansion control plate may be added to distribute heat away from the hot spot, provide more thermal expansion away from the hot spot, or both.

FIG. 13A depicts an apparatus 1300 having a resistive heating element and an expansion control plate positioned proximate to the heating element. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

As shown, the apparatus 1300 is a modified version of the apparatus of FIG. 10A, and therefore common elements have common numbering therewith. As shown, an expansion control plate 1302 is positioned proximate to the heating element 1010.

The expansion control plate 1302 may have any shape and/or composition that provides the desired effect. In general, the expansion control plate 1302 should have a higher coefficient of thermal expansion than other surrounding materials in the module. Moreover, the thicker the expansion control plate 1302, the greater the expansion effect. Modeling, in conjunction with the teachings herein, may be used by one skilled in the art to determine the appropriate size, shape and composition of an expansion control plate 1302 according to the particular application, as with any other layer or device described herein. Accordingly, for example, a rectangular heating element may be used with an expansion control plate 1302 designed to provide the desired substantially uniform expansion, thereby avoiding the problems set forth in the discussion of FIG. 10C above. Moreover, expansion control plates 1302 may be constructed for use with any of the heating elements described herein.

Preferred materials for the expansion control plate 1302 include nonmagnetic metals such as aluminum, though magnetic materials may be used in some approaches.

In one approach, the expansion control plate 1302 has a rectangular profile.

In other approaches, the expansion control plate 1302 has a nonrectangular profile. For example, the expansion control plate 1302 may be wider in a center region than at opposite ends, as shown in FIG. 13B. This design tends to draw heat away from the hot spot near the center of the heating element, thereby distributing the heat more evenly so that other portions of the module expand more uniformly. Preferred materials for the expansion control plate 1302 in this approach are materials with a higher thermal conductivity than surrounding materials, and a lower to moderate coefficient of thermal expansion.

In yet another approach, the expansion control plate 1302 is thinner in a center region than at opposite ends, as shown in FIG. 13C. Preferred materials for the expansion control plate 1302 in this approach are materials with a relatively higher coefficient of thermal expansion, where the outer ends would expand more than the center due to the larger sections.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a module having an array of transducers; and
a heating element positioned proximate to the array of transducers, the heating element having opposite ends and a center portion positioned therebetween,
wherein the heating element is configured to produce more heat per unit length along the opposite ends than in the center portion, wherein a resistivity of the center portion is less than a resistivity of each of the opposite ends.

2. An apparatus as recited in claim 1, wherein a first material of the center portion has lower resistivity than a second material of each of the opposite ends.

3. An apparatus as recited in claim 1, the center portion having a length in a range of between approximately one third of a length of the array of transducers to approximately two thirds of the length of the array of transducers.

4. An apparatus as recited in claim 1, wherein the heating element is a thin film resistive element.

5. An apparatus as recited in claim 3, wherein the length of the array of transducers includes data transducers as endpoints of a measurement of the length.

6. An apparatus as recited in claim 1, the heating element having a rectangular shape.

7. An apparatus as recited in claim 1, comprising a controller electrically coupled to the heating element wherein the controller is configured to control a power level applied to the heating element for controlling an extent of thermal expansion of the module based on a current state of expansion of a magnetic recording tape moving over the module.

8. An apparatus as recited in claim 1, further comprising:
a drive mechanism for passing a magnetic medium over the array of transducers; and
a controller electrically coupled to the heating element and the array of transducers.

* * * * *